(No Model.)

T. A. EGAN.
PNEUMATIC TIRE FOR WHEELS.

No. 518,229. Patented Apr. 17, 1894.

WITNESSES:

INVENTOR
Thomas A. Egan,
BY
ATTORNEYS

UNITED STATES PATENT OFFICE.

THOMAS A. EGAN, OF JERSEY CITY, NEW JERSEY.

PNEUMATIC TIRE FOR WHEELS.

SPECIFICATION forming part of Letters Patent No. 518,229, dated April 17, 1894.

Application filed July 11, 1893. Serial No. 480,141. (No model.)

*To all whom it may concern:*

Be it known that I, THOMAS A. EGAN, a citizen of the United States, residing at Jersey City, Hudson county, in the State of New Jersey, have invented a new and useful Improvement in Pneumatic Tires for Wheels, of which the following is a full, clear, and exact description, reference being had to the accompanying drawings, forming part thereof.

My invention relates to tires for wheels of the general character used upon bicycles and said invention consists in the arrangement and combination of parts and to certain details hereinafter described and claimed.

The object of my invention is to produce a pneumatic tire which can be readily taken apart and repaired.

Figure 1:
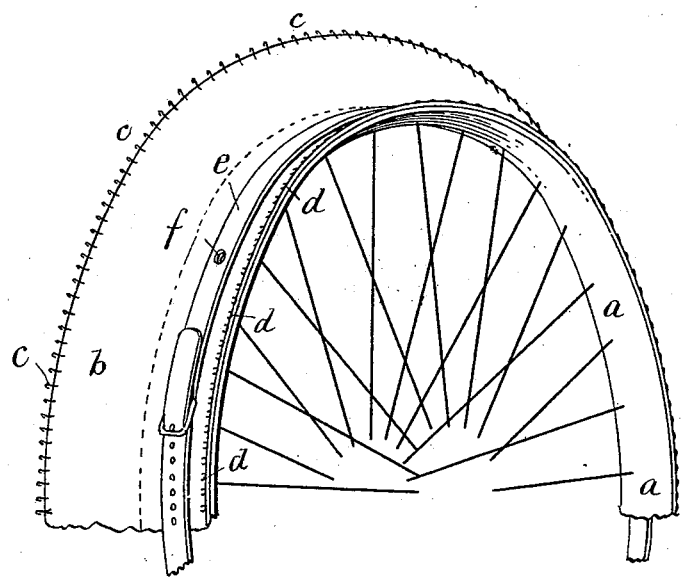
Figure 2:
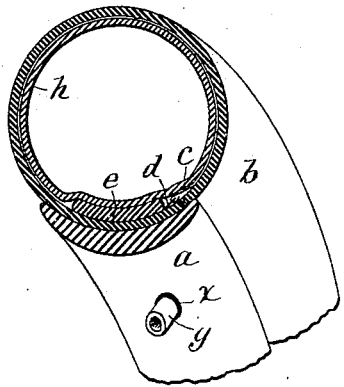
Figure 3:
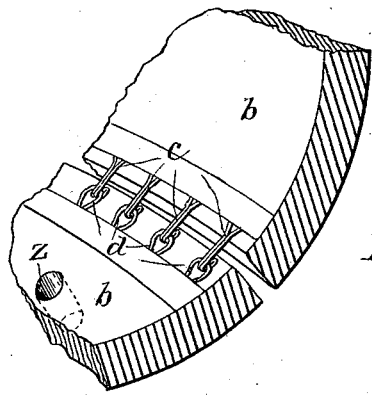

In the drawings, Figure 1 is a perspective view of a portion of a wheel embodying my invention, the inner tire being omitted. Fig. 2 is a cross section of a portion of my improved tire inflated. Fig. 3 is an enlarged detail perspective view showing the means for uniting the edges of the outer tire.

The letter $a$ in the drawings designates the rim of a wheel to which my tire is applied and is preferably concave on the outer face thereof as shown in Fig. 2 and is provided with one or more apertures $x$, through which the valve for inflating the tire is adapted to pass. An outer tire $b$ is formed of an endless band of any suitable material provided with a series of hooks $c$ and a series of eyes $d$ for uniting the edges thereof, (see Fig. 3) and has one or more apertures $z$ therein for the passage of the valve $g$. For securing the tire $b$ to the rim $a$ of the wheel I employ a strap $e$ having suitable means for securing the same and being provided with one or more holes or apertures $f$ through which passes the valve $g$, communicating with an inner inflatable tire $h$.

In order to put my device into use and presuming that the parts are disconnected, I first place the outer tire $b$ in the rim $a$ of the wheel, so that the hole $z$ in said tire will register with the hole $x$ in the rim, and so that the hooks or eyes on one edge will be protected by the rim. The strap $e$ is next placed over the tire $b$ so that the hole $f$ therein will register with the holes $x z$ in the rim of the wheel and in the tire. When the strap is tightened, one side of the outer tire $b$ is held tight and secured in the concave face of the rim $a$. The interior inflatable tire $h$ from which the air has been exhausted is next placed in position on the strap $e$ so that the valve thereon will protrude through the holes in the rim of the wheel, the outside tire $b$ and the strap $e$, whereby ready access may be had thereto. When this is accomplished as described, the hooks and eyes $c$ $d$ are secured together uniting the edges of the outside tire $b$ and inclosing within it the inner inflatable tire $h$. The inner tire is then inflated in the usual manner when the device is ready for use.

It will be seen that by my invention a reliable and effective pneumatic tire is produced which can be readily taken apart and put together without the aid of tools.

Having described my invention, what I claim, and desire to secure by Letters Patent, is—

1. An outside tire for wheels consisting of an endless belt suitably secured to the wheel rim and having hooks and eyes uniting the edges thereof, substantially as and for the purposes described.

2. The combination of a wheel rim $a$, an outside tire $b$ consisting of an endless belt with means for uniting the edges thereof, a strap $e$ for securing said outside tire to the rim $a$ and an inner tire $h$ adapted to be surrounded by said tire $b$, substantially as and for the purposes specified.

THOMAS A. EGAN.

Witnesses:
JAS. L. SUYDAM,
GEO. E. MORSE.